Patented May 13, 1941

2,242,086

UNITED STATES PATENT OFFICE 2,242,086

SURFACE-ACTIVE PRODUCTS AND A PROCESS OF PREPARING THEM

Karl Platz and Fritz Bücking, Frankfort-on-the-Main, and Karl Smeykal and Friedrich Asinger, Leuna, Kreis Merseburg, Germany, assignors to I. G. Farbenindustrie Aktiengesellschaft, Frankfort-on-the-Main, Germany No Drawing. Application June 14, 1940, Serial No. 340,532. In Germany June 26, 1939

6 Claims. (Cl. 260—508)

The present invention relates to surface-active products and to a process of obtaining them. It especially relates to products of the general formula:

$$R-SO_2-NR_1-R_2-SO_3H$$

wherein $R-SO_2$ stands for the radical of the product obtained by the simultaneous action of sulfur dioxide and halogen upon saturated aliphatic hydrocarbons having at least 8 carbon atoms, $R_1$ stands for a member of the group consisting of hydrogen and hydrocarbon radicals and $R_2$ means an aromatic radical.

We have found that surface-active substances being excellently stable against the salts that cause the hardness of water and having a high foaming, wetting and washing power may be obtained by condensing compounds containing sulfur, oxygen and halogen and being produced by the action of halogen and sulfur dioxide on aliphatic hydrocarbons having at least 8 carbon atoms, with aromatic amino-sulfonic acids or by first condensing the compounds containing sulfur, oxygen and halogen with aromatic amines and treating the condensation products obtained with sulfonating agents.

The compounds serving as starting materials for the preparation of the sulfonic acids claimed and containing sulfur, oxygen and halogen are obtained from aliphatic hydrocarbons or mixtures of hydrocarbons having at least 8 carbon atoms, for instance from the substances obtainable during the catalytic hydrogenation of the oxides of carbon at ordinary pressure or at a raised pressure or the dehydrogenation products thereof or the polymerization products made therefrom which are subjected to a subsequent hydrogenation. The products obtained during the catalytic hydrogenation of the oxides of carbon at ordinary pressure or at an only slightly raised pressure may be freed from the unsaturated compounds containing oxygen by a method other than hydrogenation, for instance by the treatment with sulfuric acid or solvents. Mixtures of saturated hydrocarbons obtainable by refining and hydrogenation from natural or synthetic benzines, illuminating oils and paraffines are likewise suitable. Particularly good surface-active products are obtained by performing the condensation by means of compounds containing sulfur, oxygen and halogen which have been prepared by the reaction of sulfur dioxide and halogen upon hydrocarbons with exposure to light of short wave length; furthermore with the aid of compounds on which sulfur dioxide and halogen have been caused to act only to such an extent that merely part of the hydrocarbons used as starting materials has been transformed into compounds containing sulfur, oxygen and halogen. The compounds formed during the simultaneous action of halogen and sulfur dioxide in a liquid condition on saturated aliphatic hydrocarbons or hydrocarbon halides contain readily hydrolyzable halogen atoms, according to the conditions applied besides halogen atoms directly bound to carbon; they, therefore, show similar properties as the sulfonic acid halides or the halogen-sulfonic acid halides.

As aromatic amino-sulfonic acids which are reacted with the compounds named containing sulfur, oxygen and halogen there are suitable for instance amino-benzene sulfonic acids, such as 2-aminobenzene-sulfonic acid-(1), 3-aminobenzene-sulfonic acid-(1), 4-aminobenzene-sulfonic acid-(1), or 4-methylaminobenzene-sulfonic acid-(1); furthermore aminotoluene-sulfonic acids and aminoxylene-sulfonic acids, amino-naphthalene-sulfonic acids such as 1-aminonaphthalene-sulfonic acid-(4), 1-aminonaphthalene-sulfonic acid-(7), 2-aminonaphthalene-sulfonic acid-(6), benzidine-sulfonic acids or benzylamine-sulfonic acids. The aromatic amino-sulfonic acids are suitably used in the form of their alkali metal salts. In some cases the reaction may be carried through in an aqueous solution according to the process of Schotten-Baumann; it is likewise possible to operate in the anhydrous form in the presence of acid-binding agents, such as sodium carbonate, sodium acetate, chalk, pyridine.

The process may also advantageously be performed as follows: the compounds containing sulfur, oxygen and halogen are first condensed with aromatic amines and the condensation products thus formed are then treated with sulfonating agents. As amines which are reacted with the compounds containing sulfur, oxygen and halogen there may be named: aniline, methyl-aniline, butyl-aniline, hexyl-aniline, oxethyl-aniline, benzyl-amine, alpha-naphthylamine, beta-naphthylamine. The products of the reaction are transformed according to known sulfonating methods into the water-soluble form. For the sulfonation there may, for instance, be used sulfuric acid monohydrate, fuming sulfuric acid, sulfuric acid containing fuming sulfuric acid or chlorosulfonic acid. The sulfonation may be effected in the presence of solvents, such as diethyl-ether, dibutyl-ether or chlorinated hydrocarbons, such as methylene chloride, chloroform or in liquid hydrocarbons such as ligroine.

According to the present invention there is started from readily accessible mixtures of hydrocarbons; the process yields in a simple manner products having valuable surface-active properties.

The compounds obtained according to the present invention constitute light, feebly yellow, water-soluble substances. They are suitable for the treatment of materials of all kinds, such as textiles, leather, paper or the like. The products are excellently stable against the salts that cause the hardness of water; they have a high wetting, foaming, emulsifying and washing power; some of the products may be used with advantage as leveling, coloring and softening agents. The products may be used as washing agents in households for cleansing purposes and in the textile industry, especially for scouring wool, cotton, silk, artificial silk, for hygienic purposes and especially owing to the good foaming power as a shampoo. The products are also suitable for breaking emulsions in the petroleum industry.

The products may be used alone, in mixture with each other or in mixture with other capillary-active substances, such as soap and other textile adjuvants, with colloidal substances, such as mucilage, glue, water-soluble cellulose derivatives, starch, bentonite, saponine or the like; or with organic solvents, for instance butyl-alcohol, benzyl-alcohol, xylenyl-glycol, but likewise with inorganic salts, for instance sodium sulfate, sodium carbonate, sodium pyrophosphate, sodium metaphosphate, tri-sodium-phosphate, or with organic salts having complex-forming properties, such as salts of the nitrilo-tri-acetic acid or of the ethylene-bis-imino-di-acetic acid, with agents giving off oxygen, such as sodium perborate or with sodium hypochlorite.

The following examples serve to illustrate the invention, but they are not intended to limit it thereto, the parts being by weight:

1. A mixture of hydrocarbons obtained by the hydrogenation of carbon monoxide at ordinary pressure, subjected to a subsequent hydrogenation and distilled at a temperature between 240° C. and 340° C. is treated at about 20° C. with sulfur dioxide and chlorine while exposing it to ultraviolet light; after this operation the content of hydrolyzable chlorine amounts to 5.5–6 per cent. By heating the product under reduced pressure it is freed from dissolved hydrochloric acid and then reacted with aniline. This product is then freed from unaltered hydrocarbons by extraction with a suitable solvent, for instance methyl alcohol. 70 parts of the product thus purified and containing 8.74 per cent of sulfur and 4.00 per cent of nitrogen are dissolved in 70 parts of methylene chloride. 26 parts of chlorosulfonic acid are then added, drop by drop, within ½ hour at 10° C.–20° C. and the whole is stirred for some time. When the product of the reaction dissolves in water or dilute caustic soda solution to a clear solution, the mixture is caused to drop together with caustic soda solution into a mixture of ice and water, the reaction being always alkaline to phenolphthalein. As soon as the neutralization is complete, the solvent is separated and the solution is evaporated to dryness. 100 parts of a slightly yellow powder are obtained. The product dissolves also in very hard water, for instance water of 35° (German degree of hardness) to a completely clear solution; it possesses an excellent foaming power and good washing properties. The product may be used together with soap in hard water because it has the property of very finely dispersing lime soap.

A product having similar properties is obtained by using methyl-aniline or ethyl-aniline instead of aniline.

2. 46 parts of sodium sulfanilate of 100 per cent strength are mixed with 30 parts of a product containing oxygen, sulfur and chlorine. The product is obtained from a fraction of a Pennsylvanian petroleum freed by refining from unsaturated compounds and boiling between 200° C. and 370° C. by the simultaneous action of sulfur dioxide and chlorine at room temperature with exposure to ultraviolet light. The product has a content of hydrolyzable chlorine of above 12 to 13 per cent. A small quantity of pyridine is suitably added as a catalyst and the whole is stirred at 55° C. to 60° C. until a test portion is soluble in water to a clear solution. The solution is then evaporated to dryness. A product is thus obtained having properties which resemble those of the product described in Example 1.

3. 72 parts of sodium sulfanilate are mixed with 180 parts of anhydrous pyridine. In the course of ¼ to ½ hour there are introduced into the mixture, drop by drop, at ordinary temperature 180 parts of the product of the reaction of sulfur dioxide and chlorine with a mixture of hydrocarbons as it is used in Example 1 and containing 4.87 per cent of sulfur, 7.30 per cent of total chlorine and 5.54 per cent of hydrolyzable chlorine. The mixture is stirred for several hours at 60° C. to 70° C. 126 parts of caustic soda solution of 37 per cent strength are then added and pyradine, unaltered hydrocarbons and water are distilled under reduced pressure. A feebly yellow product remains which dissolves even in water of 35° (German degree of hardness) to a clear solution. The solutions have an excellent foaming power. The product is, therefore, a useful shampoo.

4. In a similar manner a condensation product is obtained from 90 parts of sodium naphthionate and 180 parts of a product containing oxygen, sulfur and chlorine, as it is used in Example 2. The condensation product thus obtained is soluble in water to a clear solution and may be used as a textile adjuvant in the dye bath.

5. 23 parts of sodium metanilate are dissolved in 60 parts of anhydrous pyridine and 60 parts of a product containing oxygen, sulfur and chlorine as it is used in Example 2 are added, drop by drop. The reaction is terminated in the manner described in Example 2. A product of similar properties as that of Example 2 is obtained.

6. Paraffin oil is transformed by means of sulfur dioxide and chlorine with exposure to light of short wave length into a mixture of compounds containing oxygen, sulfur and chlorine. By the reaction with an excess of aniline the hydrolyzable chlorine is exchanged for the aniline radical. 40 parts of the condensation product are dissolved in 60 parts of chloroform and the solution is mixed at 10° C. to 20° C. with 13 parts of chloro-sulfonic acid. After having stirred the whole for some time at the temperature named, the product is soluble in water and alkali to a clear solution. The product obtained has good washing properties.

7. 30 parts of the condensation product used in Example 1 are gradually mixed at 10° C. to 20° C. with 40 parts of concentrated sulfuric acid. The whole is stirred at 25° C. to 30° C. until the product dissolves in water and alkali to a clear solution. The product is then worked up in the manner described in Example 1. A product is obtained having the same properties as that of Example 1.

8. A mixture of hydrocarbons boiling between 250° C. and 300° C. which is obtained by fractionating a Pennsylvanian petroleum is transformed by a subsequent hydrogenation into a mixture of entirely saturated hydrocarbons. The mixture of hydrocarbons thus obtained is then subjected while exposing it to light of short wave length to the simultaneous action of sulfur dioxide and chlorine until a degree of reaction of about 50 per cent is attained. The product formed is then reacted with alpha-naphthylamine. The product is then freed from unaltered hydrocarbons by extraction with a suitable solvent. 41 parts of the product thus purified are dissolved in 41 parts of dibutyl ether, 13 parts of chlorosulfonic acid are added drop by drop in the course of 1 hour and the whole is stirred at 10° C. to 20° C. until a test portion of the product dissolves in water to a clear solution. The product is neutralized in the manner described in Example 1; 58 parts of a feebly yellow product are obtained; the product has good wetting, foaming and washing properties.

9. A mixture of hydrocarbons obtained by the hydrogenation of carbon monoxide at a moderately raised pressure is split up by a fractional distillation into the following fractions:

(1) A fraction boiling between 60° C. and 240° C. (2) a fraction boiling between 240° C. and 340° C. and (3) a fraction boiling between 340° C. and 360° C. The hydrocarbons distilling between 60° C. and 240° C. are subjected to a subsequent hydrogenation and then treated at about 20° C. with sulfur dioxide and chlorine, while exposing them to ultraviolet light. If the product contains 9.17 per cent of hydrolyzable chlorine, the introduction of sulfur dioxide and chlorine is interrupted and the product is freed from dissolved hydrochloric acid and sulfur dioxide by gently heating it under reduced pressure. The product contains carbon, hydrogen, sulfur, oxygen and chlorine. According to its reactions it must be regarded as a mixture of sulfochlorides. By the reaction with an excess of aniline a mixture of sulfanilides is obtained. It is freed from unaltered hydrocarbons by extraction with a suitable solvent. 28 parts of the mixture of sulfanilides are mixed at 10° C. to 20° C. with fuming sulfuric acid of 20 per cent strength until a test portion of the product dissolves in water to a clear solution and the solution remains clear after having been allowed to stand for 1 hour. The product is then rendered neutral to litmus paper by means of caustic soda solution and evaporated. A feebly yellow powder is obtained which readily dissolves in water. The product may be used as a wetting agent in alkaline liquids, for instance as a wetting agent for mercerizing purposes.

A product of similar properties is obtained by using ortho-toluidine or para-toluidine instead of aniline.

10. The fraction of hydrocarbons distilling between 340° C. and 360° C. named in the preceding example is subjected to a subsequent hydrogenation. By the treatment with sulfur dioxide and chlorine the mixture of hydrocarbons is then transformed into a mixture of sulfochlorides. The product of the reaction must contain 4.65 per cent of hydrolyzable chlorine. The product is then freed from unaltered hydrocarbons by treating it with a suitable solvent. The content of hydrolyzable chlorine is raised thereby to 9.94 per cent. By reacting the product with aniline, it is transformed into a mixture of sulfanilides. 41 parts of the mixture of sulfanilides are dissolved in the same amount of chloroform and 14 parts of chlorosulfonic acid are run into the solution at 10° C. to 20° C., in the course of 4 hours, while stirring. After the product has become soluble in water, it is rendered neutral to litmus paper and evaporated. The product is an excellent washing agent.

11. The mixture used in Example 9 consisting of sulfochlorides and containing as an average 9 carbon atoms is transformed by means of N-hexylaniline into a mixture of N-hexylsulfanilides and freed from unaltered hydrocarbons by the extraction with suitable solvents. 36 parts of the mixture thus obtained are dissolved in the same quantity of methylene chloride. 14 parts of chlorosulfonic acid are then caused to run in in the course of 3–4 hours and the whole is stirred until the product of the reaction has become soluble in water. There is then neutralized with potassium lye, the solvent is distilled and evaporated to dryness. A product of the following constitution

is obtained which readily dissolves in water and may be used as a wetting agent. This agent is excellently effective at a neutral, an acid or an alkaline reaction already in small quantities of for instance 0.1–0.2 gram per liter at a temperature of 20° C. as well as at a raised temperature.

We claim:

1. The compounds of the general formula:

$$R—SO_2—NR_1—R_2—SO_3H$$

wherein $R—SO_2$ stands for the radical of the product obtained by the simultaneous action of sulfur dioxide and halogen upon saturated aliphatic hydrocarbons having at least 8 carbon atoms, $R_1$ stands for a member of the group consisting of hydrogen and hydrocarbon radicals and $R_2$ means an aromatic radical.

2. The product of the general formula:

$$R—SO_2—NH—C_6H_4—SO_3H$$

wherein $R—SO_2$ means the radical of the product obtained by the simultaneous action of sulfur dioxide and chlorine upon a mixture of saturated aliphatic hydrocarbons boiling between 240° C. to 340° C., formed by the reduction of carbon monoxide at normal pressure and subsequent hydrogenation of the reaction product.

3. The product of the general formula $$R_1—SO_2—NH—C_6H_4—SO_3H$$

wherein $R_1—SO_2$ means the radical of the product obtained by the simultaneous action of sulfur dioxide and chlorine upon a mixture of saturated aliphatic hydrocarbons boiling between 340° C. and 360° C. formed by the reduction of carbon monoxide at a moderately elevated pressure and a subsequent hydrogenation of the reaction product.

4. The process which comprises causing a product obtained by the simultaneous action of sulfur dioxide and halogen upon saturated aliphatic hydrocarbons having at least 8 carbon atoms to react with aromatic amines and sulfonating the condensation product thus obtained.

5. The process which comprises causing a product obtained by the simultaneous action of sulfur dioxide and chlorine upon a mixture of saturated aliphatic hydrocarbons boiling between 240° C. and 340° C. formed by the reduction of carbon monoxide at normal pressure and subsequent hydrogenation of the reaction product to react with aniline and sulfonating the condensation product thus obtained.

6. The process which comprises causing a product obtained by the simultaneous action of sulfur dioxide and chlorine upon a mixture of saturated aliphatic hydrocarbons boiling between 340° C. and 360° C. formed by the reduction of carbon monoxide at a moderately elevated pressure and subsequent hydrogenation of the reaction product to react with aniline and sulfonating the condensation product thus obtained.

KARL PLATZ.
FRITZ BÜCKING.
KARL SMEYKAL.
FRIEDRICH ASINGER.